United States Patent
Murschall et al.

(10) Patent No.: US 6,849,325 B2
(45) Date of Patent: Feb. 1, 2005

(54) WHITE BIAXIALLY ORIENTED FILM MADE FROM A CRYSTALLIZABLE THERMOPLASTIC AND HAVING A HIGH LEVEL OF WHITENESS

(75) Inventors: Ursula Murschall, Nierstein (DE); Ulrich Kern, Ingelheim (DE); Klaus Oberlaender, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/769,619

(22) Filed: Jan. 23, 2001

(65) Prior Publication Data

US 2002/0136875 A1 Sep. 26, 2002

(30) Foreign Application Priority Data

Feb. 19, 2000 (DE) .......................... 100 07 721

(51) Int. Cl.$^7$ .......................... B32B 7/02; B32B 27/36; B32B 19/00; B28B 21/72; B29D 22/00
(52) U.S. Cl. .................. 428/212; 428/213; 428/144; 428/35.7; 428/34.7; 428/480; 428/701; 428/702
(58) Field of Search .............. 428/34.7, 35.7, 428/144, 212, 213, 480, 701, 702, 357, 349, 34.8

(56) References Cited

U.S. PATENT DOCUMENTS

| | | | |
|---|---|---|---|
| 4,145,480 A | * | 3/1979 | Kusama et al. ............. 428/513 |
| 4,384,040 A | * | 5/1983 | von Meer ................... 427/500 |
| 5,660,931 A | | 8/1997 | Kim et al. |
| 5,900,294 A | * | 5/1999 | Murschall et al. ..... 156/244.11 |
| 5,935,903 A | * | 8/1999 | Goss et al. ................. 503/227 |
| 6,107,390 A | * | 8/2000 | Maeda et al. ............... 524/497 |

FOREIGN PATENT DOCUMENTS

EP     0 857 749 A1     8/1998

OTHER PUBLICATIONS

Merriam–Webster's Collegiate Dictionary, Tenth Edition, pp. 1303 and 1323.*

* cited by examiner

Primary Examiner—Rena Dye
Assistant Examiner—Lawrence Ferguson
(74) Attorney, Agent, or Firm—ProPat, L.L.C.

(57) ABSTRACT

The invention relates to a white film with a thickness of from 10 to 500 μm whose principal constituent is a crystallizable thermoplastic. It also has to comprise at least one titanium dioxide of the rutile type as white pigment and at least one optical brightener. The optical brightener and/or the titanium dioxide are fed as a masterbatch during film production. A white film of this type is particularly suitable for interior decoration, for constructing exhibition stands, for exhibition requisites, for displays, for placards, for labels, in the fitting out of shops or of stores, as a promotional requisite or as a laminating material or for applications associated with food or drink.

14 Claims, No Drawings

WHITE BIAXIALLY ORIENTED FILM MADE FROM A CRYSTALLIZABLE THERMOPLASTIC AND HAVING A HIGH LEVEL OF WHITENESS

The invention relates to a white biaxially oriented film made from a crystallizable thermoplastic and having a high level of whiteness and a thickness of from 10 to 500 μm. The film comprises at least titanium dioxide as pigment, and an optical brightener, and has good orientability and very good optical and mechanical properties. The invention further relates to a process for producing this film and to the use of the film.

BACKGROUND OF THE INVENTION

White films with a thickness of from 10 to 500 μm are well known. The whiteness of these known films is generally ≦80%. The films also have an undesirable yellow tinge, that is to say they are not brilliant white. The Yellowness Index, which depends on thickness, is >45 for films of thickness from 10 to 100 μm, for example.

The object of the present invention was to provide a white film with a thickness of from 10 to 500 μm which, besides having good orientability, good mechanical properties and good optical properties, above all has a high level of whiteness in combination with a low Yellowness Index.

The good optical properties include uniform, streak-free coloration over the entire width and length of the film, low transparency (≦40%) and an acceptable surface gloss (≧10).

A low Yellowness Index means that according to the invention the Yellowness Index of the films at a film thickness of from 10 to 500 μm is ≦40, preferably ≦35, particularly preferably ≦30.

A high level of whiteness means that the whiteness of the films is ≧85%, preferably ≧87%, in particular ≧90%.

The good mechanical properties include a high modulus of elasticity (EMD>3300 N/mm2; ETD>4800 N/mm2), and also good tear strengths (in MD>130 N/mm2; in TD>180 N/mm2) and good longitudinal and transverse elongations at break (in MD>120%; in TD>70%).

Good orientability includes excellent capabilities of the film for orientation during its production, both longitudinally and transversely, without break-offs.

The novel film should moreover be recyclable, that is to say that any cut material arising during continuous film production can be fed back into the production operation, in particular without loss of optical or mechanical properties from the film.

DESCRIPTION OF THE INVENTION

This object is achieved by a white film with a thickness of from 10 to 500 μm whose principal constituent is a crystallizable thermoplastic, wherein the film comprises at least one titanium dioxide of the rutile type as white pigment and at least one optical brightener, where the optical brightener and/or the titanium dioxide are fed as a masterbatch during film production.

The white film comprises, as principal constituent, a crystallizable thermoplastic. Examples of suitable crystallizable or semicrystalline thermoplastics are polyethylene terephthalate, polybutylene terephthalate, polyethylene naphthalate, and preference is given to polyethylene terephthalate.

For the purposes of the present invention, a crystallizable thermoplastic is a crystallizable homopolymer;
a crystallizable copolymer;
a crystallizable compound;
a crystallizable recycled material, or
another type of crystallizable thermoplastic.

The white film may have one layer, or else two or more layers. The white film may also have been coated with various copolyesters or with adhesion promoters.

The white film comprises at least titanium dioxide of the rutile type as pigment, and the amount of pigment here is preferably from 0.3 to 25% by weight, based on the weight of the crystallizable thermoplastic. According to the invention, the titanium dioxide is fed by way of what is known as masterbatch technology during film production.

The film comprises at least one optical brightener, and the amount of the optical brightener used here is from 10 to 50,000 ppm, in particular from 20 to 30,000 ppm, particularly preferably from 50 to 25,000 ppm, based on the weight of the crystallizable thermoplastic. According to the invention, the optical brightener is also fed by way of what is known as masterbatch technology during film production.

The optical brighteners according to the invention are capable of absorbing UV radiation in the region from 360 to 380 nm and of re-emitting this as longer-wavelength, visible blue-violet light.

Suitable optical brighteners are bisbenzoxazoles, phenylcoumarins and bisstearylbiphenyls, in particular phenylcoumarin, and particularly preferably triazine phenylcoumarin, which is obtainable as the product ÒTinopal from Ciba-Geigy, Basle, Switzerland, or else ÒHostalux KS (Clariant, Germany), or else ÒEastobrite OB-1 (Eastman).

Besides the optical brightener, blue dyes soluble in polyester may also be added if this is useful. Dyes which have proven successful are cobalt blue, ultramarine blue and anthraquinone dyes, in particular Sudan Blue 2 (BASF, Ludwigshafen, Germany).

The amounts of the blue dyes used are from 10 to 10,000 ppm, in particular from 20 to 5000 ppm, particularly preferably from 50 to 1000 ppm, based on the weight of the crystallizable thermoplastic.

The titanium dioxide particles are composed predominantly of rutile, which has higher covering power than anatase. In one preferred embodiment, the titanium dioxide particles are composed of at least 95% by weight of rutile. They may be prepared by a customary process, e.g. by the chloride process or the sulfate process. The amount of these present in the core layer is appropriately from 0.3 to 25% by weight, based on the weight of the core layer. The average particle size is relatively low, preferably from 0.10 to 0.30 μm, measured by the Sedigraph method.

Using titanium dioxide of the type described above avoids any occurrence of vacuoles within the polymer matrix during film production.

The titanium dioxide particles may have a coating made from inorganic oxides, such as the coating usually used for TiO2 white pigment in papers or in paints for improving lightfastness.

It is known that TiO2 is photoactive. On exposure to UV radiation, free radicals form on the surfaces of the particles. These free radicals may migrate into the polymer matrix, and this causes degradation reactions and yellowing. To avoid this, the TiO2 particles may be oxidically coated. Oxides particularly suitable for the coating include those of aluminum, silicon, zinc and magnesium, and mixtures of two or more of these compounds. TiO2 particles with a coating of a number of these compounds are described in EP-A-0 044 515 and EP-A-0 078 633, for example. The coating may also comprise organic compounds having polar and nonpolar groups. The organic compounds must have sufficient thermal stability during production of the film by extrusion of the polymer melt. Examples of polar groups are —OH; —OR; —COOX; (X=R; H or Na, R=alkyl having from 1 to 34 carbon atoms). Preferred organic compounds are alkanols and fatty acids having from 8 to 30 carbon atoms in the alkyl group, in particular fatty acids and primary n-alkanols having from 12 to 24 carbon atoms, and also polydiorganosiloxanes and/or polyorganohydrosiloxanes, e.g. polydimethylsiloxane and polymethylhydrosiloxane.

The coating for the titanium dioxide particles is usually composed of from 1 to 12 g, in particular from 2 to 6 g, of inorganic oxides and/or from 0.5 to 3 g, in particular from 0.7 to 1.5 g, of organic compound, based on 100 g of titanium dioxide particles. The coating is usually applied to the particles in aqueous suspension. The inorganic oxides may be precipitated from water-soluble compounds, e.g. an alkali metal nitrate, in particular sodium nitrate, sodium silicate (waterglass) or a silica in aqueous suspension.

Inorganic oxides such as Al2O3 or SiO2 also include the hydroxides and their various stages of dehydration, e.g. oxide hydrate, although the exact composition and structure of these is not known. The oxide hydrates, for example of aluminum and/or silicon, are precipitated onto the TiO2 pigment after ignition and grinding in aqueous suspension, and the pigments are then washed and dried. This precipitation may therefore be carried out directly in a suspension produced in the production process after the ignition and the subsequent wet grinding. The oxides and/or oxide hydrates of the respective metals are precipitated from the water-soluble metal salts in the known pH range. For aluminum, for example, aluminum sulfate is used in aqueous solution (pH≦4), and the oxide hydrate is precipitated by adding aqueous ammonia or sodium hydroxide solution in the pH range from 5 to 9, preferably from 7 to 8.5. If a waterglass solution or alkali metal aluminate solution is used as starting material, the pH of the TiO2 suspension initially charged should be in the strongly alkaline range (pH≧8). The precipitation is then carried out by adding mineral acid, such as sulfuric acid, in the pH range from 5 to 8. After precipitation of the metal oxides, stirring of the suspension continues for from 15 min to about 2 hours, whereupon the precipitated layers undergo ageing. The coated product is removed from the aqueous dispersion and washed and dried at an elevated temperature, in particular at from 70 to 100° C.

In a preferred embodiment, the novel film comprises, besides the crystallizable thermoplastic, which is preferably polyethylene terephthalate, from 0.3 to 25% by weight of titanium dioxide of rutile type with a particle diameter of from 0.1 to 0.5 μm, fed as a masterbatch during film production, preferably titanium dioxide from Kerr McGee (®Tronox RFK2) or Sachtleben (®Hombitan, grades R or RC) and also from 10 to 50,000 ppm of an optical brightener, which is likewise fed via a masterbatch and which is soluble in the thermoplastic, particularly preferably triazine phenyl-coumarin (®Tinopal, Ciba Geigy, Switzerland), ®Hostalux KS (Clariant, Germany) or else ®Eastobright OB-1 (Eastman).

If desired, the novel film may also comprise a blue dye, and this is also appropriately fed as a masterbatch during film production. ®Sudan Blue 2 (BASF, Germany) is preferred.

The synergistic action of the rutile-type titanium dioxide and of the optical brightener, and of feeding by way of masterbatch technology, gives the film a whiteness of ≧85%, preferably ≧87%, in particular ≧90%, combined with a Yellowness Index of ≦40, preferably ≦35, in particular ≦30, at a thickness of from 10 to 500 μm. The appearance of the film is extremely white and it has no yellow tinge.

The standard viscosity SV (DCA) of the polyethylene terephthalate, measured in dichloroacetic acid to DIN 53728, is from 600 to 1000, preferably from 700 to 900.

The intrinsic viscosity IV (DCA) is calculated from the standard viscosity SV (DCA) as follows:

$$IV(DCA)=6.67\cdot10-4 SV(DCA)+0.118$$

The novel white film may have either one layer or else two or more layers. In the embodiment having two or more layers, the white film has a structure of at least one core layer and at least one outer layer, and particular preference is given here to a three-layer A-B-A or A-B-C structure.

A substantive factor for this embodiment is that the polyethylene terephthalate of the core layer has a standard viscosity similar to that of the polyethylene terephthalate of the outer layer(s) which is/are adjacent to the core layer.

In one particular embodiment, the outer layers may also be composed of a polyethylene naphthalate homopolymer or of a polyethylene terephthalate-polyethylene naphthalate copolymer, or of a compound. In this particular embodiment, the thermoplastics of the outer layers likewise have a standard viscosity similar to that of the polyethylene terephthalate of the core layer.

In the embodiment having two or more layers, the titanium dioxide and also the optical brightener and, if present, the blue dye are preferably present in the core layer. Modification of the outer layers is also possible, if required.

In the embodiment having two or more layers, unlike in the single-layer embodiment, the amount of additives is based on the weight of the thermoplastics in the layer provided with the additive(s).

In addition, the novel film is easy to recycle without pollution of the environment and without loss of mechanical properties, making it suitable, for example, for use as short-lived promotional placards, labels or other promotional requisites.

An example of a production process for producing the novel film is extrusion on an extrusion line.

According to the invention, the titanium dioxide, the optical brightener and, if present, the blue dye are added by way of masterbatch technology. The additives are fully dispersed in a solid carrier material. Carrier materials which may be used are the thermoplastic itself, e.g. the polyethylene terephthalate, or else other polymers sufficiently compatible with the thermoplastic.

It is important that the particle size and the bulk density of the masterbatch(es) are similar to the particle size and the bulk density of the thermoplastic, so that uniform dispersion is achieved, and with this a uniform white color and a uniform Yellowness Index.

The polyester films may be produced by known processes from a polyester with, if desired, other polymers, and also with the optical brightener, with the titanium dioxide, if desired with the blue dye, and/or with a usual amount of from 0.1 to a maximum of 10% by weight of other customary additives, either in the form of monofilms or else in the form of, if desired, coextruded films having two or more layers and with identical or differently constructed surfaces, where one surface may have provision of pigment, but no pigment is present in the other surface. Known processes may also have been used to provide one or both surfaces of the film with a conventional functional coating.

In the preferred extrusion process for producing the polyester film, the polyester material melted in the extruder is extruded through a slot die and quenched on a chill roll, as a substantially amorphous prefilm. This film is then reheated and stretched longitudinally and transversely, or transversely and longitudinally, or longitudinally, transversely and again longitudinally and/or transversely. According to the invention, the stretching temperatures are from Tg+10 K to Tg+60 K (where Tg is the glass transition temperature), the longitudinal stretching ratio according to the invention is from 2 to 6, in particular from 2.5 to 4.5, and the transverse stretching ratio is from 2 to 5, in particular from 3 to 4.5, and the ratio for any second longitudinal stretching carried out is from 1.1 to 3. The first longitudinal stretching may, if desired, be carried out simultaneously with the transverse stretching (simultaneous stretching). This is followed by the heat-setting of the film at oven temperatures of from 200 to 260° C., in particular from 220 to 250° C. The film is then cooled and wound up.

The surprising combination of excellent properties makes the novel film highly suitable for a variety of different applications, such as interior decoration, for constructing exhibition stands, for exhibition requisites, for displays, for placards, for labels, in the fitting out of shops or of stores, as a promotional requisite or as a laminating material or for applications associated with food or drink.

The examples below illustrate the invention in more detail.

The following standards and methods are used here when testing individual properties.

Test Methods

Surface Gloss

Surface gloss is measured with a measurement angle of 20° to DIN 67530.

Luminous Transmittance/Transparency

For the purposes of the present invention, the luminous transmittance/transparency is the ratio of total light transmitted to the amount of incident light.

Luminous transmittance is measured using "Hazegard plus" test equipment to ASTM D 1003.

Surface Defects and Uniform Coloration

Surface defects and uniform coloration are determined visually.

Mechanical Properties

The modulus of elasticity, tear strength and elongation at break are measured longitudinally and transversely to ISO 527-1-2.

SV (DCA) and IV (DCA)

The standard viscosity SV (DCA) is measured by a method based on DIN 53726 in dichloroacetic acid.

The intrinsic viscosity (IV) is calculated as follows from the standard viscosity (SV)

$$IV(DCA)=6.67 \cdot 10-4 SV(DCA)+0.118$$

Yellowness Index

The Yellowness Index YID is the deviation from the colorless condition in the "yellow" direction and is measured to DIN 6167.

Whiteness

Whiteness is determined by the method of Berger, generally using more than 20 layers of film mutually superposed. To determine whiteness with the aid of the ®ELREPHO electrical reflectance photometer from Zeiss, Oberkochem, Germany, standard illuminant C, 2° standard observer. Whiteness is defined as W=RY+3RZ−3RX.

W=whiteness, and RY, RZ and RX=corresponding reflection factors using the Y, Z and X color measurement filter. The white standard used is a pressing of barium sulfate (DIN 5033, Part 9). Hansl Loos "Farbmessung" [Color measurement], Verlag Beruf and Schule, Itzehoe (1989), for example, gives a detailed description.

In the examples and comparative examples below, each of the films is a single-layer film or a film having two or more layers, in each case produced on the extrusion line described.

EXAMPLE 1

A white film of 75 µm thickness was produced and comprised the clear polymer polyethylene terephthalate (RT49, KoSa, Germany) as principal constituent, 7% by weight of rutile-type titanium dioxide (Tronox RFK2, Kerr McGee, Germany), 200 ppm of optical brightener (Hostalux KS, Clariant, Germany) and also 30 ppm of blue dye Sudan Blue 2 (BASF, Germany).

The additives titanium dioxide, optical brightener and blue dye were added as masterbatches.

The polyethylene terephthalate from which the film was produced, and the polyethylene terephthalate used for preparing the masterbatches, had a standard viscosity SV (DCA) of 810, corresponding to an intrinsic viscosity of 0.658 dl/g.

Masterbatch (1) was composed of 50% by weight of titanium dioxide, 0.14% by weight of optical brightener and also 49.86% by weight of clear polymer. Masterbatch (2) comprised, in addition to clear polymer, 1500 ppm of blue dye.

Prior to extrusion, 14% by weight of masterbatch (1), 2% by weight of masterbatch (2) and also 84% by weight of clear polymer were dried at a temperature of 150° C. and then melted in the extruder.

EXAMPLE 2

A white film of 75 µm thickness was again produced. The film of Example 2 comprised 14% by weight of masterbatch (1) and 86% by weight of clear polymer, but no blue dye.

EXAMPLE 3

A coextruded, white ABA film of 23 µm thickness was produced, where A are the outer layers and B is the core layer. The mixing specification for the core layer, 20 µm in thickness, corresponded to the mixing specification for Example 2. The outer layers, 1.5 µm in thickness, comprised 93% by weight of clear polymer, and also 7% by weight of a masterbatch. Besides clear polymer, the masterbatch comprised 10,000 ppm of silicon dioxide (®Sylobloc, Grace, Germany). This film had very particularly high surface gloss.

COMPARATIVE EXAMPLE 1

A monofilm of 75 µm thickness was produced. The mixing specification for the film corresponded to that of Example 2, but no optical brightener was present in the titanium dioxide masterbatch.

COMPARATIVE EXAMPLE 2

Like the film of Comparative Example 1, the white film of Comparative Example 2, 75 µm in thickness, comprised, besides clear polymer, only 7% by weight of titanium dioxide. The titanium dioxide used here, however, was of anatase type (®Hombitan, Sachtleben, Germany), and had been incorporated into the polyester directly during its preparation.

The white PET films produced had the property profile illustrated in the table below:

TABLE

| Properties | Ex. 1 | Ex. 2 | Ex. 3 | Comp. Ex. 1 | Comp. Ex. 2 |
|---|---|---|---|---|---|
| Thickness [μm] | 75 | 75 | 23 | 75 | 75 |
| Surface gloss side 1 | 50 | 55 | 160 | 45 | 50 |
| (Measurement angle 20°) side 2 | 50 | 50 | 160 | 50 | 50 |
| Luminous transmittance/ transparency [%] | 30 | 28 | 40 | 30 | 32 |
| Whiteness (method of Berger) [%] | 94 | 94 | 90 | 84 | 82 |
| Yellowness Index (YID) | 20 | 22 | 12 | 31 | 48 |
| Longitudinal modulus of elasticity [N/mm2] | 4400 | 4300 | 4400 | 4300 | 4350 |
| Transverse modulus of elasticity [N/mm2] | 5700 | 5500 | 5500 | 5600 | 5650 |
| Longitudinal tear strength [N/mm2] | 200 | 210 | 200 | 250 | 200 |
| Transverse tear strength [N/mm2] | 260 | 270 | 260 | 260 | 260 |
| Longitudinal elongation at break [%] | 140 | 140 | 120 | 140 | 135 |
| Transverse elongation at break [%] | 90 | 100 | 100 | 100 | 90 |
| Coloration | brilliant white | brilliant white | brilliant white | white | tinged yellow |

What is claimed is:

1. A biaxally oriented white film having a thickness of from 10 to 500 μm, comprising a crystallizable polyolefin-free thermoplastic polyester polymer that is substantially vacuole-free at least one titanium dioxide of the rutile type that is oxidatively coated, and at least one optical brightener; wherein the titanium dioxide and the optical brightener are provided in the form of at least one masterbatch, said film exhibiting a Yellowness index of less than or equal to 40 for films having a thickness of from 10 to 500 microns.

2. The white film as claimed in claim 1, wherein the film comprises a crystallizable thermoplastic polyester polymer selected from the group consisting of polyethylene terephthalate, polybutylene terephthalate and polyethylene naphthalate.

3. The white film as claimed in claim 1, wherein the titanium dioxide is present between 0.3 and 25% by weight, based on the weight of the crystallizable thermoplastic polyester polymer.

4. The white film as claimed in claim 1, wherein, based on the weight of the crystallizable thermoplastic polyester polymer, the optical brightener is present from 10 to 50,000 ppm.

5. A white film having a thickness of from 10 to 500 μm, comprising a crystallizable polyolefin-free thermoplastic polyester polymer, at least one titanium dioxide of the rutile type that is oxidatively coated, and at least one optical brightener; wherein the titanium dioxide and the optical brightener are provided in the form of at least one masterbatch and the film comprises an optical brightener selected from the group consisting of bisbenzoxazoles, phenylcoumarins and bisstearylbiphenyls, said optical brightener present from 10 to 50,000 ppm, based on the weight of the crystallizable thermoplastic polyester polymer.

6. A white film having a thickness of from 10 to 500 μm, comprising a crystallizable polyolefin-free thermoplastic polyester polymer, at least one titanium dioxide of the rutile type that is oxidatively coated, and at least one optical brightener; wherein the titanium dioxide and the optical brightener are provided in the form of at least one masterbatch, said film further comprising a polyester-soluble blue dye.

7. The white film as claimed in claim 1, wherein said titanium dioxide has a composition that is at least 95% by weight rutile, and wherein said titanium dioxide exists as titanium dioxide particles having an average particle size of from 0.10 to 0.30 μm, where the particle size is determined using a Sedigraph method.

8. A white film having a thickness of from 10 to 500 μm, comprising a crystallizable polyolefin-free thermoplastic polyester polymer, at least one titanium dioxide of the rutile type that is oxidatively coated, and at least one optical brightener; wherein the titanium dioxide and the optical brightener are provided in the form of at least one masterbatch and said titanium dioxide has a composition that is at least 95% by weight rutile and exists as titanium dioxide particles having an average particle size of from 0.10 to 0.30 μm, where the particle size is determined using a Sedigraph method, the titanium dioxide particles having the oxidic coating consisting of inorganic oxide(s) or of organic compound(s) or of inorganic oxide(s) and of organic compound(s), the coating comprising from 1 to 12 g of inorganic oxide(s) or from 0.5 to 3 g of organic compound(s), or from 1 to 12 g of inorganic oxides(s) and from 0.5 to 3 g of organic compound(s) based on 100 g of titanium dioxide particles.

9. A white film having a thickness of from 10 to 500 μm, comprising a crystallizable polyolefin-free thermoplastic polyester polymer, at least one titanium dioxide of the rutile type that is oxidatively coated, and at least one optical brightener; wherein the titanium dioxide and the optical brightener are provided in the form of at least one masterbatch, and wherein the film has a whiteness that is 85% and a Yellowness Index that is 40.

10. The white film as claimed in claim 1, wherein the film has one or more layers, and wherein said layers consist of a core layer and at least one outer layer.

11. A white film having a thickness of from 10 to 500 μm, comprising a crystallizable polyolefin-free thermoplastic polyester polymer, at least one titanium dioxide of the rutile type that is oxidatively coated, and at least one optical brightener; wherein the titanium dioxide and the optical brightener are provided in the form of at least one masterbatch, the film having one or more layers, the layers consisting of a core layer and at least one outer layer, wherein the titanium dioxide and the optical brightener are present in the core layer.

12. A white film having a thickness of from 10 to 500 μm, comprising a crystallizable polyolefin-free thermoplastic polyester polymer, at least one titanium dioxide of the rutile type that is oxidatively coated, and at least one optical brightener; wherein the titanium dioxide and the optical brightener are provided in the form of at least one masterbatch, the film further comprising an optical brightener selected from the group consisting of bisbenzoxazoles, phenylcoumarins and bisstearylbiphenyls and polyester-soluble blue dye selected from the group consisting of cobalt blue, ultramarine blue, anthraquinone dyes and combinations thereof, and wherein said polyester-soluble blue dye is present from 10 to 10,000 ppm, based on the weight of the crystallizable thermoplastic polyester polymer.

13. A white film having a thickness of from 10 to 500 μm, comprising a crystallizable polyolefin-free thermoplastic polyester polymer, at least one titanium dioxide of the rutile type that is oxidatively coated, and at least one optical brightener; wherein the titanium dioxide and the optical brightener are provided in the form of at least one masterbatch, said film having one or more layers, said layers consisting of a core layer and at least one outer layer, wherein the titanium dioxide and the optical brightener are additionally present in the outer layer(s).

14. A white film having a thickness of from 10 to 500 μm, comprising a crystallizable polyolefin-free thermoplastic polyester polymer, at least one titanium dioxide of the rutile type that is oxidatively coated, and at least one optical brightener; wherein the titanium dioxide and the optical brightener are provided in the form of at least one masterbatch, said film exhibiting a Yellowness index of less than or equal to 40 for films having a thickness of from 10 to 500 microns, wherein said white film further comprises regrind.

* * * * *